United States Patent
Jeong et al.

(10) Patent No.: US 6,790,347 B2
(45) Date of Patent: Sep. 14, 2004

(54) BATCH STYLE WASTEWATER TREATMENT APPARATUS USING BIOLOGICAL FILTERING PROCESS AND WASTEWATER TREATMENT METHOD USING THE SAME

(75) Inventors: Yong-Dae Jeong, Yongin (KR); Jae-Jin Lee, Suwon (KR); Gyung-Hae Aohh, Yongin (KR); Jong-Bok Park, Yongin (KR)

(73) Assignee: Samsung Engineering Co., Ltd., Seoul (KR)

( * ) Notice: Subject to any disclaimer, the term of this patent is extended or adjusted under 35 U.S.C. 154(b) by 0 days.

(21) Appl. No.: 10/277,791

(22) Filed: Oct. 23, 2002

(65) Prior Publication Data

US 2003/0111412 A1 Jun. 19, 2003

(30) Foreign Application Priority Data

Oct. 24, 2001 (KR) .................................. 10-2001-65671

(51) Int. Cl.$^7$ ................................ C02F 3/30; C02F 3/08
(52) U.S. Cl. ........................ 210/143; 210/151; 210/605; 210/618; 210/622; 210/903; 210/908
(58) Field of Search .................... 210/605, 615–618, 210/622, 630, 97, 143, 150, 151, 194, 252, 259, 903, 906

(56) References Cited

U.S. PATENT DOCUMENTS

| | | | |
|---|---|---|---|
| 2,308,866 A | 1/1943 | Dekema | 210/617 |
| 2,352,901 A | 7/1944 | Klein | 210/120 |
| 3,853,752 A | 12/1974 | Tymoszczuk | 210/618 |
| 4,076,616 A | 2/1978 | Verde | 210/618 |
| 5,350,505 A | 9/1994 | Tang | 210/108 |
| 5,582,733 A | 12/1996 | Desbos et al. | 210/605 |
| 5,750,041 A | 5/1998 | Hirane | 210/795 |
| 6,183,643 B1 | 2/2001 | Goodley | 210/605 |

FOREIGN PATENT DOCUMENTS

| | | |
|---|---|---|
| FR | 2760738 A1 | 9/1998 |
| FR | 2760739 A1 | 9/1998 |
| JP | 60-82191 A | 5/1985 |
| JP | A-4-87690 | 3/1992 |
| JP | 6-335696 A | 12/1994 |
| JP | 10-71396 A | 3/1998 |
| KR | A-2000-34519 | 6/2000 |

*Primary Examiner*—Fred G. Prince
(74) *Attorney, Agent, or Firm*—Burns, Doane, Swecker & Mathis, L.L.P.

(57) ABSTRACT

Provided is a wastewater treatment apparatus including a bottom portion and a plate formed above and spaced apart from the bottom portion to form a lower chamber with the bottom portion, an outlet installed on the bottom portion for drawing off water and sludge in the lower chamber before backwashing, a filter medium layer supported to the upper portion of the plate by the plate, the upper layer of which forms a bottom portion of an upper chamber, a wastewater introducing means connected to the lower chamber, for introducing wastewater to be treated into the lower chamber, a process air introducing means for supplying process air to the filter medium layer formed over the plate, a plurality of aerators formed over and spaced apart a predetermined distance from the plate, and mounted in a plurality of air flow pipes led to the process air introducing means, a backwash air introducing means for supplying backwash air to the lower chamber during backwashing, a backwash water introducing means for supplying backwash water to the lower chamber during backwashing, a plurality of nozzles extending from the lower chamber to the filter medium layer through the plate, a treated water discharging means for discharging the treated water having passed through the filter medium layer, and a returned water introducing means for returning the treated water having passed through the filter medium layer to the lower chamber. A batch style wastewater treatment apparatus utilizing biological filtering process efficiently removes the organic matter, suspended solid matter, nitrogen and phosphorus.

19 Claims, 7 Drawing Sheets

BATCH STYLE WASTEWATER TREATMENT APPARATUS USING BIOLOGICAL FILTERING PROCESS AND WASTEWATER TREATMENT METHOD USING THE SAME

BACKGROUND OF THE INVENTION

1. Field of the Invention

The present invention relates to a wastewater treatment apparatus and method using a biological filtering process, and more particularly, to a batch style wastewater treatment apparatus and method using a biological filtering process.

2. Description of the Related Art

As a biological wastewater treatment process, there are suspended growth methods, in which suspended microorganisms are utilized. According to this technique, wastewater and microorganisms are mixed in a reaction tank and air is supplied from the bottom of the reaction tank, thereby facilitating contact between wastewater and microorganisms. The microorganisms present in the reaction tank are capable of removing pollutants using oxygen contained in the air supplied. A sequencing batch reactor (SBR) technique is one of the suspended growth methods.

Figure 1:
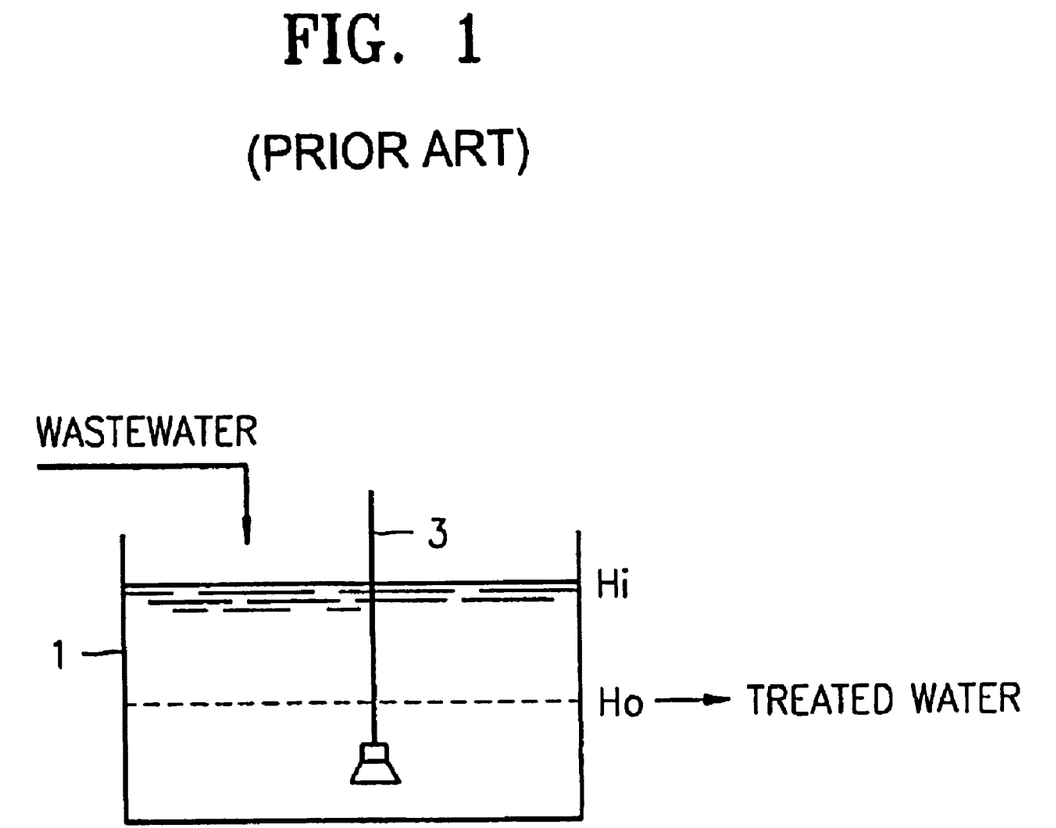
FIG. 1 is a schematic representation of a sequencing batch reactor (SBR), for illustrating a wastewater treatment method using a SBR technique.

FIG. 1 is a schematic representation of a sequencing batch reactor (SBR), for illustrating a wastewater treatment method using a SBR technique.

Referring to FIG. 1, wastewater to be treated is filled in a reaction tank 1 up to an inflow level $H_i$ and the wastewater is aerated using an aerator 3 while stirring, to permit a reaction to occur. If the reaction is completed, sludge is precipitated, and supernatant liquid is decanted until the level of the reaction tank becomes an outflow level $H_o$, and then discharged. Then, before new wastewater is introduced into the reaction tank, the operation of the sequencing batch reactor is idled for a predetermined time in order to adjust a cycling time.

The SBR technique is a modified sequencing activated sludge process, in which an unsteady environmental pressure is applied to microbe consortia in a reaction tank for microbial selection, for overcoming problems arising from a heavy impact load, which may be generated during a sequencing activated sludge process, sedimentation from a settling reservoir and an increase in the settlement site area due to a secondary settling reservoir.

The SBR technique has advantages in terms of excellent impact absorbing ability and excellent sludge sedimentation capability. However, the SBR technique has the following problems.

First, the SBR technique involves complicated steps, including, wastewater filling; reaction, settlement, discharging and idling, requiring a long cycling time.

Second, a decanter for discharging treated water is required, which is economically inefficient and poor in stability.

Third, flow control is difficult due to a long cycling time.

Fourth, an objectionable smell is generated and floating scum is generated, making liquid-solid separation difficult.

Fifth, sludge may be easily drained during discharge or decanting.

Another biological wastewater treatment process includes a sequencing biological filtering method.

Figure 2:
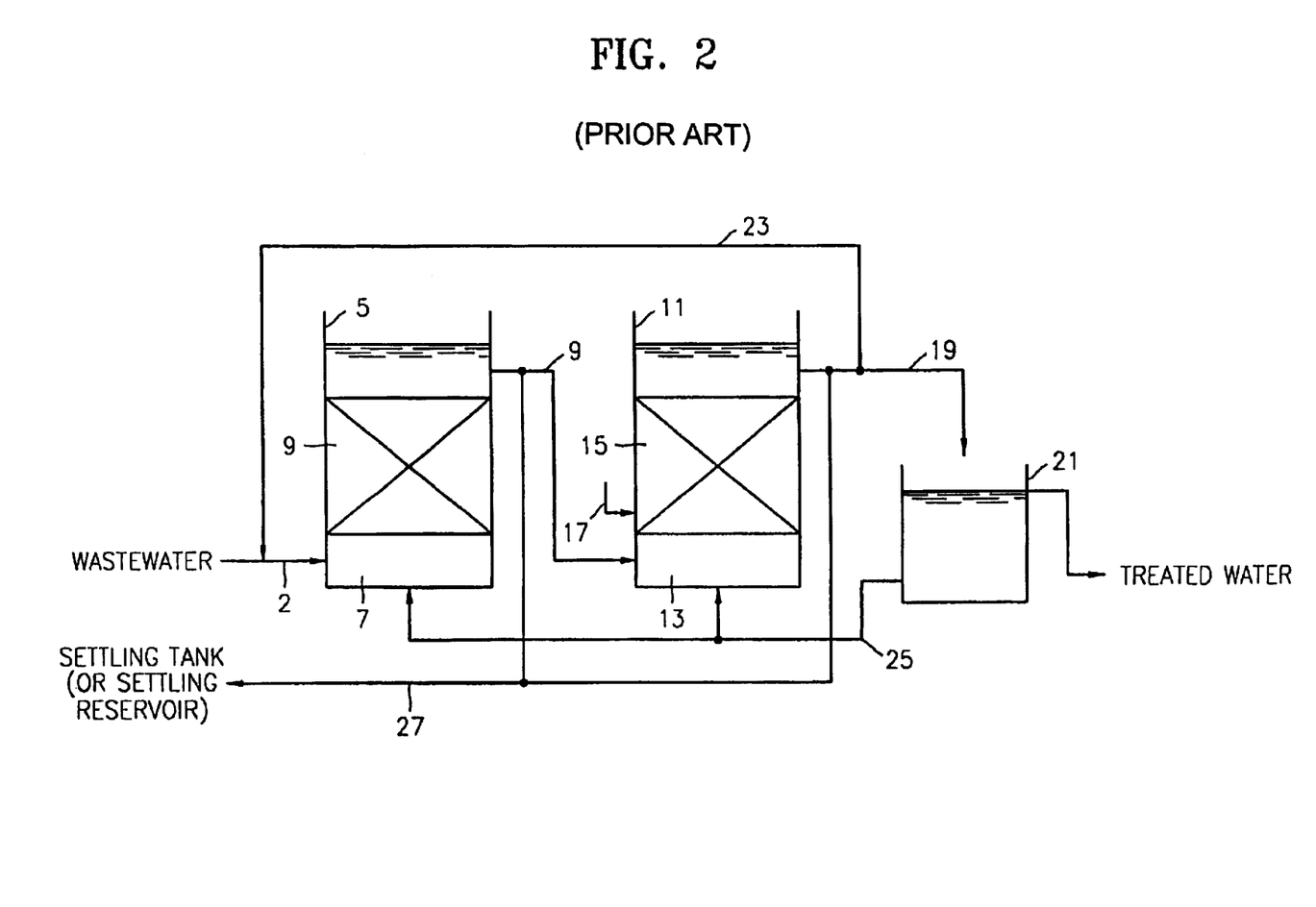
FIG. 2 shows a conventional wastewater treatment apparatus using a sequencing biological filtering process.

FIG. 2 shows a conventional wastewater treatment apparatus using a sequencing biological filtering process.

Referring to FIG. 2, a denitrification reaction in wastewater will be described. First, wastewater to be treated is introduced into a lower chamber 7 through a wastewater supply means 2 of a denitrification tank 5 in an anoxic condition and is allowed to upwardly pass through a filter medium layer 9. Here, nitrate nitrogen returned from a nitrification tank 11 through an internal returning means 23 is denitrified using organic matter in the wastewater and denitrifying microorganisms inhabiting in the filter medium layer 9.

Then, the wastewater having passed through the denitrification tank 5 is introduced into a lower chamber 13 of the nitrification tank 11 through a first discharging means 10. In this case, air is supplied to the nitrification tank 11 through a process air introducing means 17. The wastewater introduced into the lower chamber 13 is allowed to upwardly pass though the filter medium layer 15 and organic nitrogen and ammonium nitrogen contained therein are nitrified by nitrifying microorganisms.

Finally, the treated wastewater having passed through the nitrification tank 11 is discharged to a separate storage tank 21 through a second discharging means 19. The completely treated water is discharged from the storage tank 21. During backwashing, the treated water is introduced to the lower chamber 7 of the denitrification tank 5 and the lower chamber 13 of the nitrification tank 11 through a backwash water introducing means 25 to wash the filter medium layers 9 and 15. Then, the wastewater used in backwashing is discharged to the sedimentation tank or settling reservoir by a backwash water discharging means 27.

According to the sequencing biological filtering method implemented in the above-described manner, the wastewater can be effectively treated in terms of cost and performance since both physical filtering by a filter medium layer and biodegradation by microorganisms inhabiting in the filter medium layer are used for wastewater treatment, unlike in a sequencing physical filtering method in which only physical filtering by a filter medium is used.

Yet the sequencing biological filtering method has several problems.

First, biological removal of phosphorus due to phosphorus release and excessive uptake mechanism of a microbe membrane is impossible.

Second, nitrogen and phosphorus cannot be simultaneously removed in a single reaction tank.

Third, for the foregoing reason, at least two reaction tanks are required for wastewater treatment.

Fourth, clogging may be liable to occur to a filter medium layer, making it difficult to be suitably applied to high-concentration wastewater.

SUMMARY OF THE INVENTION

To solve the above-described problems, it is an object of the present invention to provide a batch style wastewater treatment apparatus using a biological filtering process.

It is another object of the present invention to provide a wastewater treatment method using the wastewater treatment apparatus.

To accomplish the first object, there is provided a wastewater treatment apparatus according to a first embodiment of the present invention.

The wastewater treatment apparatus includes a bottom portion and a plate formed above and spaced apart from the bottom portion to form a lower chamber with the bottom portion, an outlet installed on the bottom portion for drawing off water and sludge in the lower chamber before backwashing, a filter medium layer supported to the upper portion of the plate by the plate, the upper layer of which forms a bottom portion of an upper chamber, a wastewater introducing means connected to the lower chamber, for introducing wastewater to be treated into the lower chamber, a process air introducing means for supplying process air to the filter medium layer formed over the plate, a plurality of aerators formed over and spaced apart a predetermined distance from the plate, and mounted in a plurality of air flow pipes led to the process air introducing means, a backwash air introducing means for supplying backwash air to the lower chamber during backwashing, a backwash water introducing means for supplying backwash water to the lower chamber during backwashing, a plurality of nozzles extending from the lower chamber to the filter medium layer through the plate, a treated water discharging means for discharging the treated water having passed through the filter medium layer, and a returned water introducing means for returning the treated water having passed through the filter medium layer to the lower chamber.

To accomplish the above object, the present invention also provides a modification of the wastewater treatment apparatus according to the first embodiment of the present invention. That is to say, a wastewater treatment apparatus according to a second embodiment of the present invention includes a bottom portion and a plate formed above and spaced apart from the bottom portion to form a lower chamber with the bottom portion, an outlet installed on the bottom portion for drawing off water and sludge in the lower chamber before backwashing, a filter medium layer supported to the upper portion of the plate by the plate, the upper layer of which forms a bottom portion of an upper chamber, a process air introducing means for supplying process air to the filter medium layer formed over the plate, a plurality of aerators formed over and spaced apart a predetermined distance from the plate, and mounted in a plurality of air flow pipes led to the process air introducing means, a backwash air introducing means for supplying backwash air to the lower chamber during backwashing, a backwash water introducing means for supplying backwash water to the lower chamber during backwashing, a plurality of nozzles extending from the lower chamber to the filter medium layer through the plate, a treated water discharging means for discharging the treated water having passed through the filter medium layer, a returned water introducing means for returning the treated water having passed through the filter medium layer to the lower chamber, and a wastewater introducing means connected to the returned water introducing means, for introducing wastewater to be treated into the lower chamber.

In the wastewater treatment apparatuses according to the first and second embodiment of the present invention, the filter medium layer is preferably upwardly passed through by the wastewater to be treated, treated water or mixed water thereof, with or without process air, during normal operation, and the filter medium layer is preferably upwardly passed through by backwash air and backwash water during backwashing.

Also, the plurality of aerators may uniformly distribute process air in the form of fine bubbles for creating optimum conditions for growth of microorganisms during normal operation, and may include means for preventing a counterflow of the treated water during backwashing even if supply of the process air or backwash air is inhibited.

The plurality of nozzles preferably supply the wastewater to be treated, treated water or mixed water thereof, from the lower chamber to the filter medium layer, during normal operation, and preferably include means for forming an air layer having a predetermined height at the lower chamber so as to uniformly distribute backwash air having a pressure high enough to dilate the filter medium layer, during backwashing.

The filter medium layer is preferably supported by a support layer having a predetermined height covering the aerators from the upper surface of the plate.

Also, the wastewater treatment apparatus may further include an water level adjusting means for automatically adjusting the water level of the upper chamber.

The side walls of the upper chamber preferably taper downward to maximize the capacity of treated water contained in the upper chamber.

The wastewater treatment apparatus may further include a storage tank for temporarily storing the treated water introduced through the returned water introducing means and then supplying the same to the lower chamber.

According to another aspect of the present invention, there is provided a wastewater treatment method including the steps of (a) introducing wastewater to be treated to the lower chamber through the wastewater introducing means of the wastewater treatment apparatus according to first or third embodiment of the present invention and allowing the wastewater to upwardly pass through the filter medium layer until the water level of the upper chamber reaches an inflow level, under anoxic conditions, (b) returning the wastewater contained in the upper chamber to the lower chamber through the returned water introducing means for circulation so as to allow upstream passage of the filter medium layer under anoxic/anaerobic conditions, to denitrify nitrate nitrogen remaining in the previous cycle using organic matter in the wastewater and denitrifying microorganisms in the filter medium layer and also to cause a phosphorus release reaction to occur using organic matter in the wastewater and subordinate phosphorus removing microorganisms in the filter medium layer, (c) returning the wastewater from the upper chamber to the lower chamber through the returned water introducing means and causing the returned wastewater to circulate for upstream passage of the filter medium layer, while supplying air through the process air introducing means, to nitrify organic nitrogen and ammonium nitrogen using nitrifying microorganisms and to cause an excessive uptake of phosphorus using subordinate phosphorus removing microorganisms, and (d) discharging the treated water through the treated water discharging means.

The wastewater treatment apparatuses according to the first and second embodiments of the present invention may further a storage tank for temporarily storing the wastewater introduced through the returned wastewater introducing means and then supplies the same to the lower chamber, these apparatuses according to third and fourth embodiments of the present invention, respectively.

Also, the present invention provides a wastewater treatment method including the steps of (a) introducing wastewater to be treated to the lower chamber through the wastewater introducing means connected to the returned water introducing means of the wastewater treatment apparatus according to the second or fourth embodiment of the present invention and allowing the wastewater to upwardly pass through the filter medium layer until the water level of an upper chamber reaches an inflow level, under nonaeration conditions, (b) returning the wastewater contained in the upper chamber to the lower chamber through a returned water introducing means for circulation so as to allow upstream passage of the filter medium layer under anoxic/anaerobic conditions, to denitrify nitrate nitrogen remaining in the previous cycle using organic matter in the wastewater and denitrifying microorganisms in the filter medium layer and also to cause a phosphorus release reaction to occur using organic matter in the wastewater and subordinate phosphorus removing microorganisms in the filter medium layer, (c) returning the wastewater from the upper chamber to the lower chamber through the returned water introducing means and causing the, returned wastewater to circulate for upstream passage of the filter medium layer, while supplying air through the process air introducing means, to nitrify organic nitrogen and ammonium nitrogen using nitrifying microorganisms and to cause an excessive uptake of phosphorus using subordinate phosphorus removing microorganisms, and (d) discharging the treated water from which organic matter, nitrogen and phosphorus are removed through a treated water discharging means.

In an another embodiment of the present invention, there is provided a wastewater treatment method including the steps of (a) while supplying air through the process air introducing means of the wastewater treatment apparatus according to the second or fourth embodiment of the present invention, introducing wastewater to be treated to the lower chamber through the wastewater introducing means and allowing the wastewater to upwardly pass through a filter medium layer until the water level of an upper chamber reaches an inflow level, (b) returning the wastewater from the upper chamber to the lower chamber through the returned water introducing means and causing the returned wastewater to circulate for upstream passage of the filter medium layer, while supplying air through the process air introducing means, to nitrify organic nitrogen and ammonium nitrogen using nitrifying microorganisms, and (c) discharging the treated water subjected to the nitrification through a treated water discharging means.

Alternatively, the present invention provides a wastewater treatment method including the steps of (a) while supplying air, introducing wastewater to be treated to a lower chamber through a wastewater introducing means connected to a returned water introducing means of the wastewater treatment apparatus according to the second or fourth embodiment of the present invention and allowing the wastewater to upwardly pass through a filter medium layer until the water level of an upper chamber reaches an inflow level, (b) returning the wastewater from the upper chamber to the lower chamber through the returned water introducing means and causing the returned wastewater to circulate for upstream passage of the filter medium layer, while supplying air through the process air introducing means, to nitrify organic nitrogen and ammonium nitrogen using nitrifying microorganisms, and (c) discharging the treated water subjected to the nitrification through a treated water discharging means.

According to another aspect of the present invention, there is provided a wastewater treatment method including the steps of (a) introducing wastewater to be treated to a lower chamber through a wastewater introducing means of the wastewater treatment apparatus according to the second or fourth embodiment of the present invention and allowing the wastewater to upwardly pass through a filter medium layer until the water level of an upper chamber reaches an inflow level, under non-aeration conditions, (b) returning the wastewater contained in the upper chamber to the lower chamber through a returned water introducing means for circulation so as to allow upstream passage of the filter medium layer under anoxic conditions, to denitrify nitrate nitrogen remaining in the previous cycle using organic matter in the wastewater and denitrifying microorganisms in the filter medium layer, (c) returning the wastewater from the upper chamber to the lower chamber through the returned water introducing means and causing the returned wastewater to circulate for upstream passage of the filter medium layer, while supplying air through the process air introducing means, to nitrify organic nitrogen and ammonium nitrogen using nitrifying microorganisms, and (d) discharging the treated water subjected to the nitrification through a treated water discharging means.

Alternatively, there is provided a wastewater treatment method including the steps of (a) under non-aeration conditions, introducing wastewater to be treated to a lower chamber through a wastewater introducing means connected to a returned water introducing means of the wastewater treatment apparatus according to the second or fourth embodiment of the present invention and allowing the wastewater to upwardly pass through a filter medium layer until the water level of an upper chamber reaches an inflow level, (b) returning the wastewater contained in the upper chamber to the lower chamber through a returned water introducing means for circulation so as to allow upstream passage of the filter medium layer under anoxic conditions, to denitrify nitrate nitrogen remaining in the previous cycle using organic matter in the wastewater and denitrifying microorganisms in the filter medium layer, (c) returning the wastewater from the upper chamber to the lower chamber through the returned water introducing means and causing the returned wastewater to circulate for upstream passage of the filter medium layer, while supplying air through the process air introducing means, to nitrify organic nitrogen and ammonium nitrogen using nitrifying microorganisms, and (d) discharging the treated water subjected to the nitrification through a treated water discharging means.

In the wastewater treatment method according to present invention, before supplying the wastewater to the wastewater treatment apparatus, there may be further included the step of introducing the wastewater to be treated to a settling tank for removal of some of suspended solid in the wastewater.

Also, after the discharging step, there may be further included the steps of supplying backwash air from the lower chamber to the filter medium layer through a backwash air introducing means and the plurality of nozzles to dilate the filter medium layer, stopping the supply of backwash air and supplying backwash water through the backwash water introducing means and the plurality of nozzles to backwash the filter medium layer.

The backwash water is preferably the treated water discharged by one of the wastewater treatment apparatuses according to the first through fourth embodiments of the present invention.

In the wastewater treatment method according to the present invention, the respective steps are preferably repeated by automatic operation by a programmable logic controller.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

The present invention will now be described in more detail with reference to the accompanying drawings.

Figure 3:
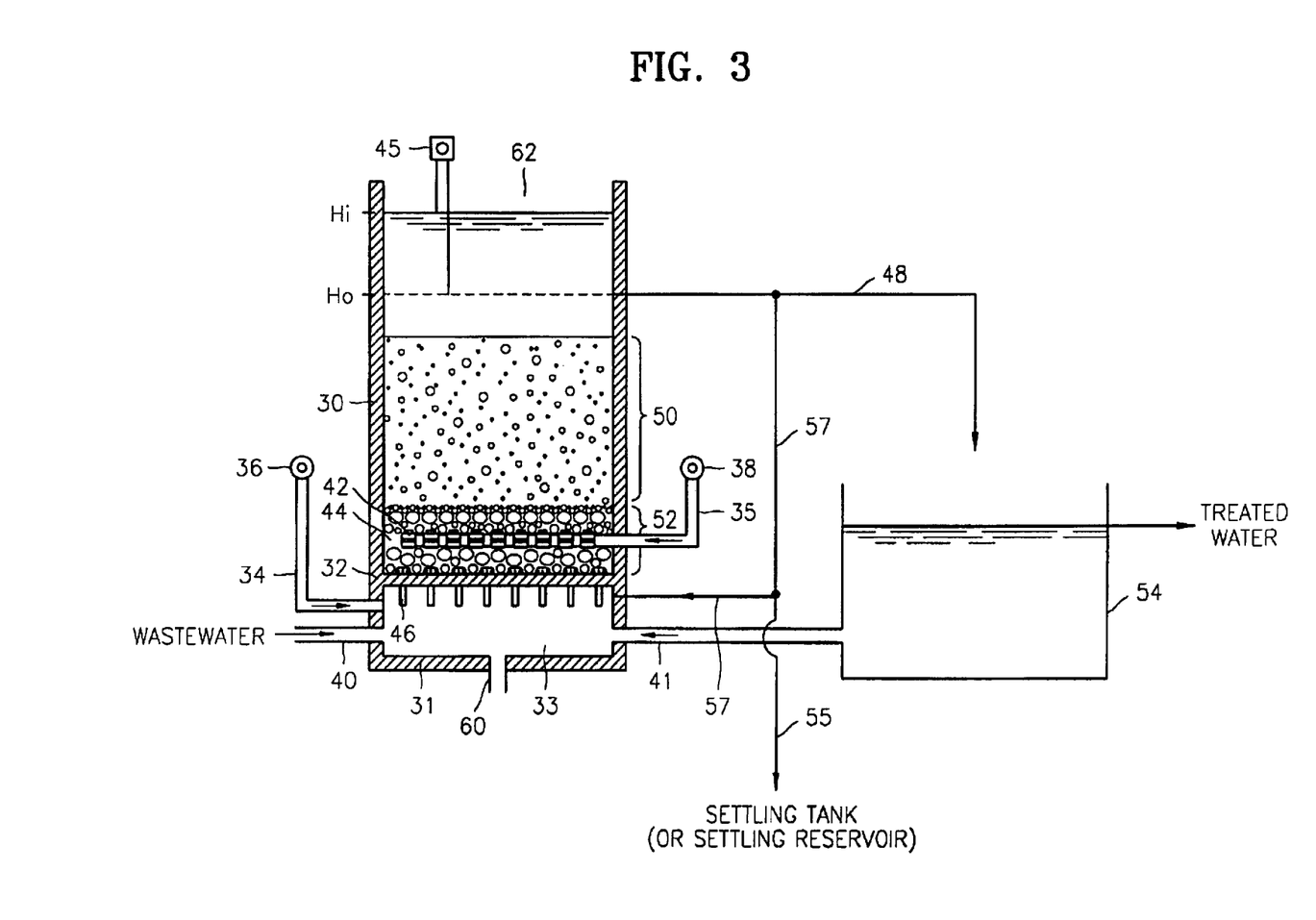
FIG. 3 is a cross-sectional view of a wastewater treatment apparatus according to a first embodiment of the present invention.

Referring to FIG. 3 showing a wastewater treatment apparatus according to a first embodiment of the present invention, the wastewater treatment apparatus includes a reaction tank 30, a plate 32, a process air introducing means 35, a backwash air introducing means 34, a wastewater introducing means 40, a water level adjusting means 45, a treated water discharging means 48, a plurality of nozzles 46, a plurality of aerators 42, a plurality of air flow pipes 44, a returned water introducing means 57 and an upper chamber 62.

A lower chamber 33 is formed at a bottom portion 31 of the reaction tank 30, and the plate 32 is closely fixed to the inner wall of the reaction tank 30 so that incoming wastewater is introduced into the upper portion of the plate 32 only through the nozzles 46.

A filter medium layer 50 is disposed over the plate 32 and is supported by a support layer 52 having a predetermined height. The upper chamber 62 is disposed over the surface layer of the filter medium layer 50. The support layer 52 is formed of pebbles, for example, and the height thereof is determined by the height of the aerators 42 in the reaction tank 30. Here, the aerators 42 and a filter medium are made not to directly contact each other for the purpose of uniformly supplying process air through the filter medium layer 50. The support layer 52 is also used to reduce consumption of the filter medium, which is expensive.

Representative examples of the filter medium used in the present invention include a material that microorganisms can be easily attached thereto or detached therefrom, such as clay or fly ash. In consideration of stable fixation of a filter medium during wastewater treatment and dilation of a filter medium layer during backwashing, the specific gravity of the filter medium is preferably in the range of 1 to 2. The size of the filter medium is adjusted so as to have an appropriate porosity from the standpoints of wastewater treatment capacity, filtering efficiency and manageability, preferably 2 to 8 mm in diameter.

To sidewalls of the reaction tank 30 are connected the wastewater introducing means 40 for introducing wastewater to be treated to the lower chamber 33, the process air introducing means 35 for supplying process air to the filter medium layer 50, the backwash air introducing means 34 for supplying backwash air to the lower chamber 33 during backwashing, the backwash water introducing means 41 for supplying backwash water to the lower chamber 33 during backwashing, the treated water discharging means 48 for discharging treated water outside of the reaction tank 30 and the returned water introducing means 57 for returning the treated water having passed through the filter medium layer 50. A process air blower 38 is connected to the process air introducing means 35 and a backwash air blower 36 is connected to the backwash air introducing means 34.

The wastewater treatment apparatus according to the present invention includes an outlet 60 installed on the bottom portion 31 for drawing off the water and sludge in the lower chamber 33 before backwashing. When the water level of the upper chamber 62 reaches an inflow level $H_i$, the water level adjusting means 45 stops a pump (not shown) of the wastewater introducing means 40 and shuts a valve (not shown). Also, the water level adjusting means 45 allows the treated water discharging means 48 to discharge the treated water to a backwash water storage tank 54 until the water level of the upper chamber 62 reaches an outflow level $H_o$.

The returned water introducing means 57 returns the treated water discharged from the treated water discharging means 48 to the lower chamber 33. A backwash water discharging means 55 transfers the treated water used in backwashing to a settling tank or to a settling reservoir. The settling tank or settling reservoir discharges sludge settling on the lower portion thereof for removal and supernatant water is introduced into the reaction tank 30 for new treatment.

The valve (not shown) installed in the treated water discharging means 48 is opened only when the treated water is discharged to the backwash water storage tank 54 after all steps for wastewater treatment are completely performed by the wastewater treatment apparatus according to the present invention, the valve being shut in the other stages.

Figure 4:
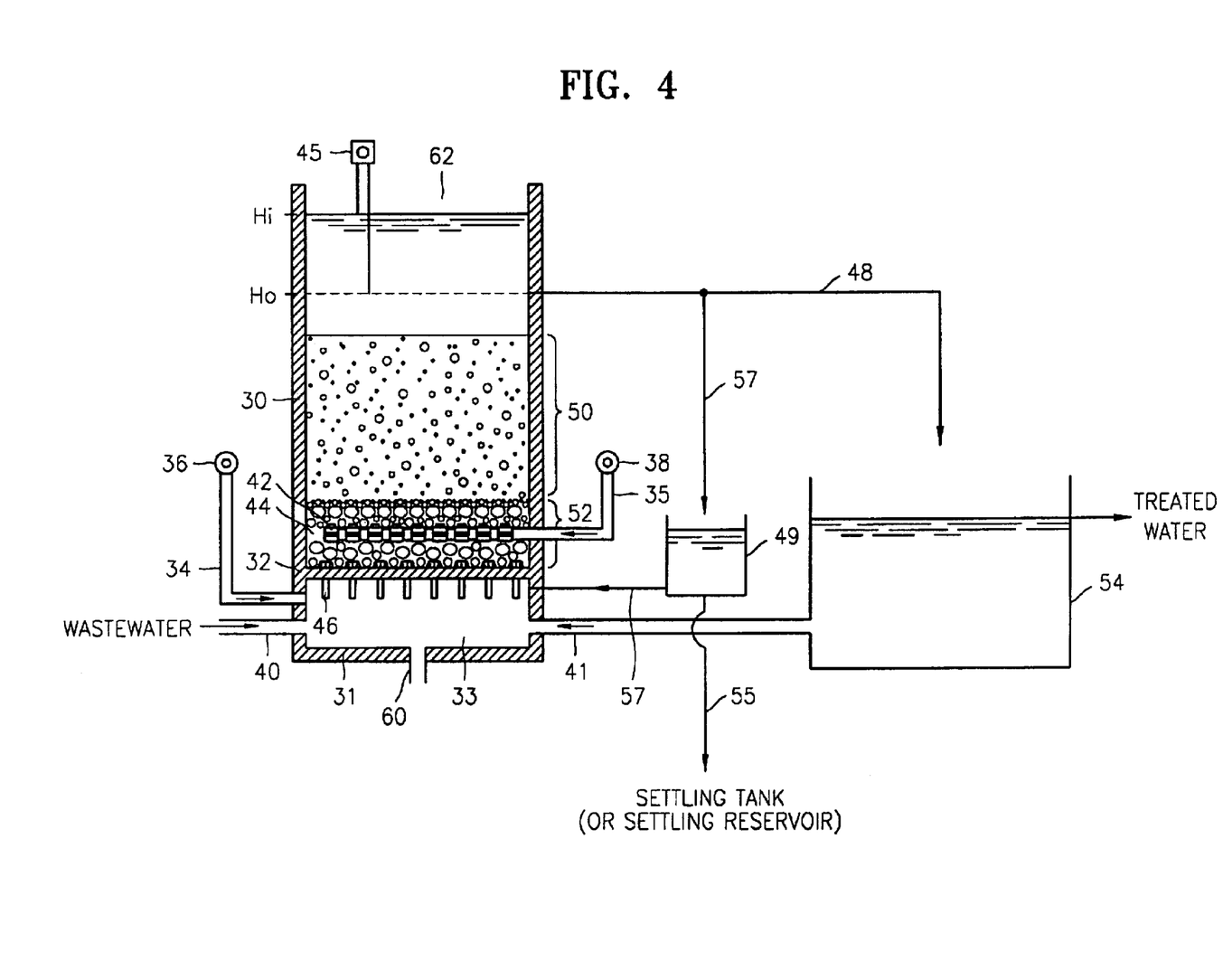
FIG. 4 is a cross-sectional view of a wastewater treatment apparatus according to a third embodiment of the present invention.

FIG. 4 is a cross-sectional view of a wastewater treatment apparatus according to a third embodiment of the present invention. Referring to FIG. 4, the wastewater treatment apparatus according to this embodiment is the same as that shown in FIG. 3, except that a storage tank 49 is further installed. The storage tank 49 temporarily stores the wastewater introduced through the returned wastewater introducing means 57 and then supplies the same to the lower chamber 33. A free board of an upper chamber 62 is lowered by further installing the storage tank 49, thereby lowering the height of the reaction tank 30. In FIG. 4, the same reference numerals as those shown in FIG. 3 denote the same elements.

Figure 5:
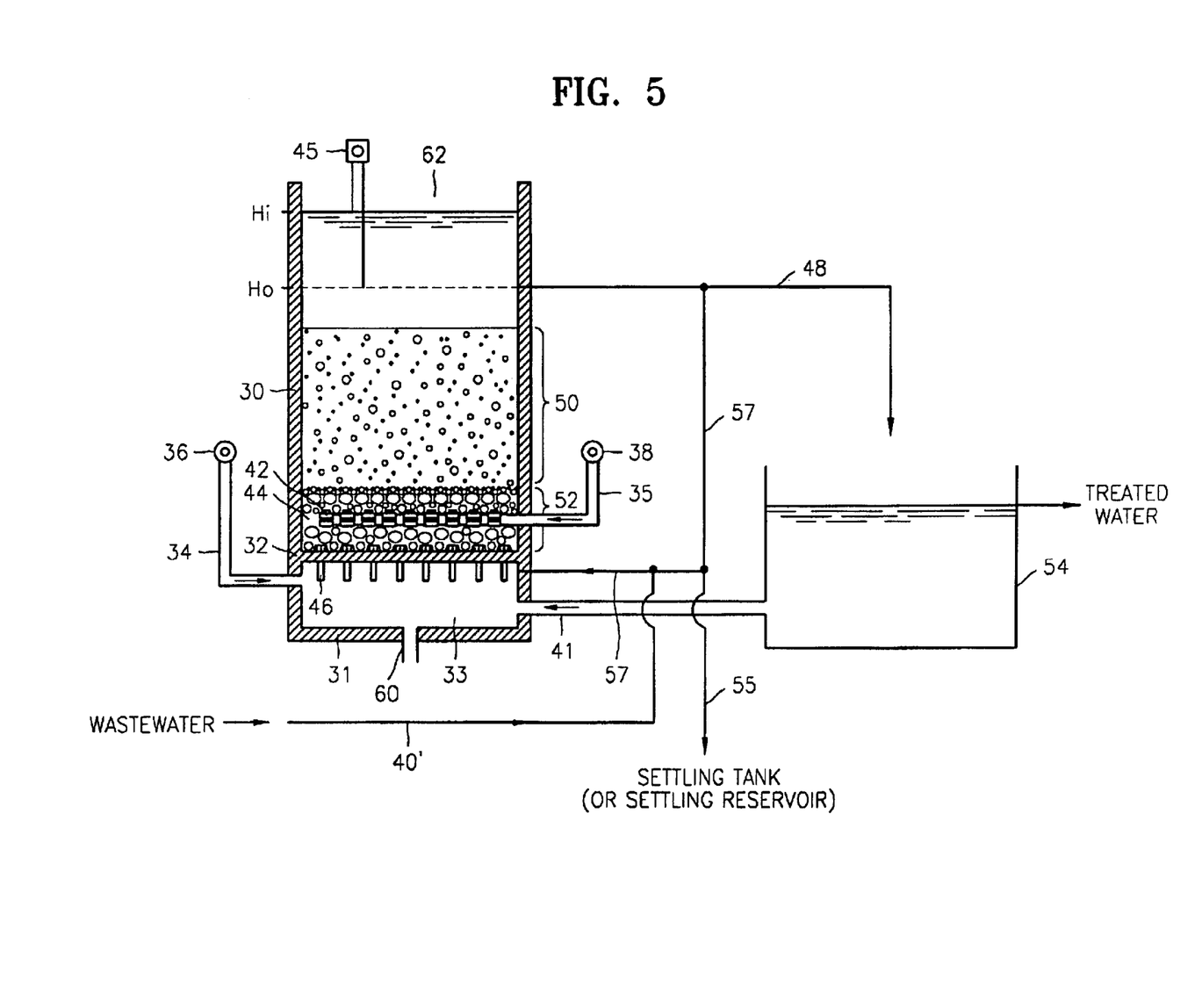
FIG. 5 is a cross-sectional view of a wastewater treatment apparatus according to a second embodiment of the present invention.

FIG. 5 is a cross-sectional view of a wastewater treatment apparatus according to a second embodiment of the present invention. Referring to FIG. 5, the wastewater treatment apparatus according to this embodiment is the same as that shown in FIG. 3, except that a wastewater introducing means 40' is not directly connected to the reaction tank 30 but to the returned water introducing means 57. That is, wastewater to be treated is supplied to the reaction tank 30 through the returned water introducing means 57. When the wastewater to be treated is supplied to the reaction tank 30 through the returned water introducing means 57, a valve (not shown) installed in a backwash water introducing means 41 is shut. In FIG. 5, the same reference numerals as those shown in FIG. 3 denote the same elements.

Figure 6:
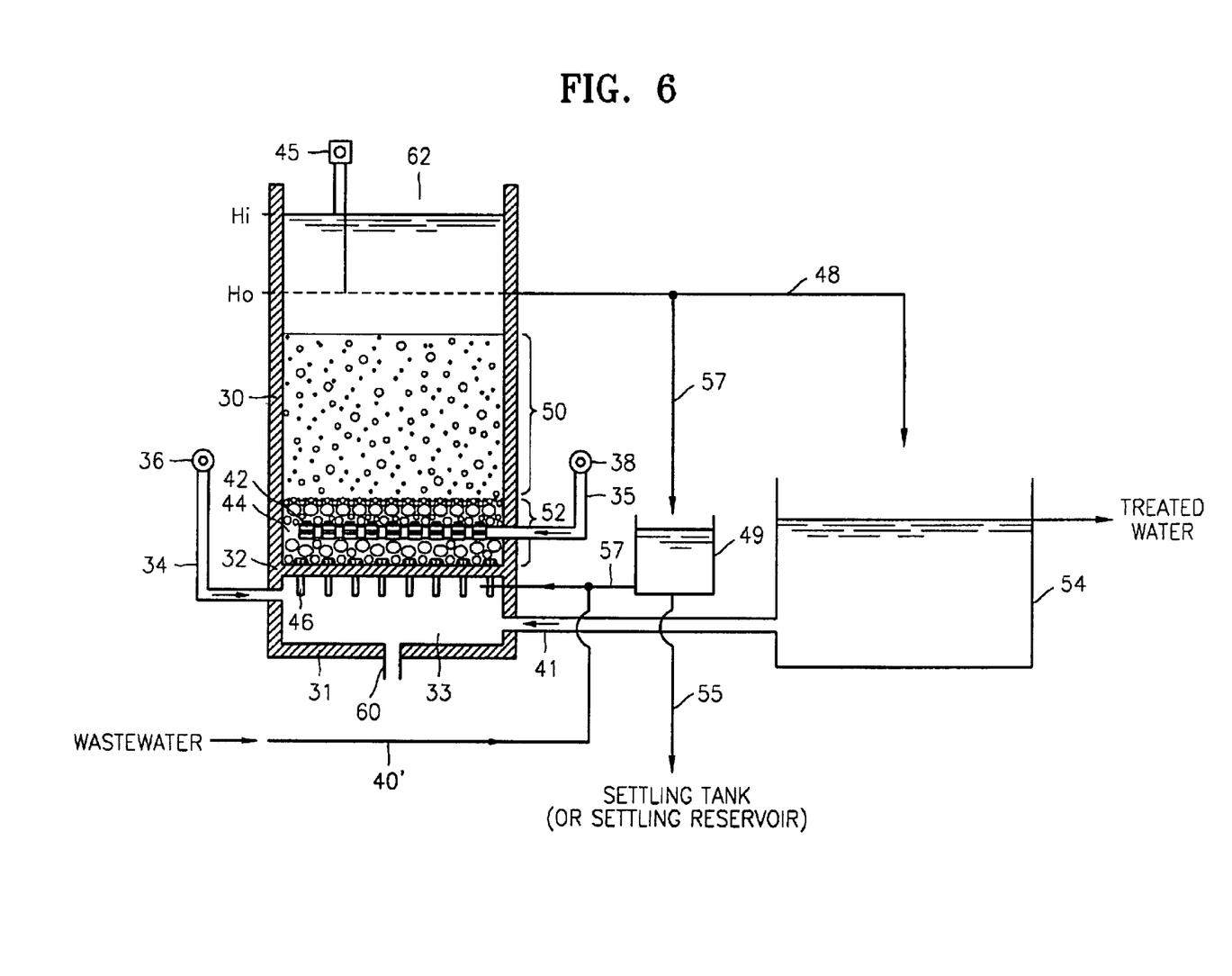
FIG. 6 is a cross-sectional view of a wastewater treatment apparatus according to a fourth embodiment of the present invention.

FIG. 6 is a cross-sectional view of a wastewater treatment apparatus according to a fourth embodiment of the present invention. Referring to FIG. 6, the wastewater treatment apparatus according to this embodiment is the same as that shown in FIG. 5, except that a storage tank 49 is further installed. The function of the storage tank 49 is described above, and in FIG. 6, the same reference numerals as those shown in FIG. 5 denote the same elements.

Figure 7:
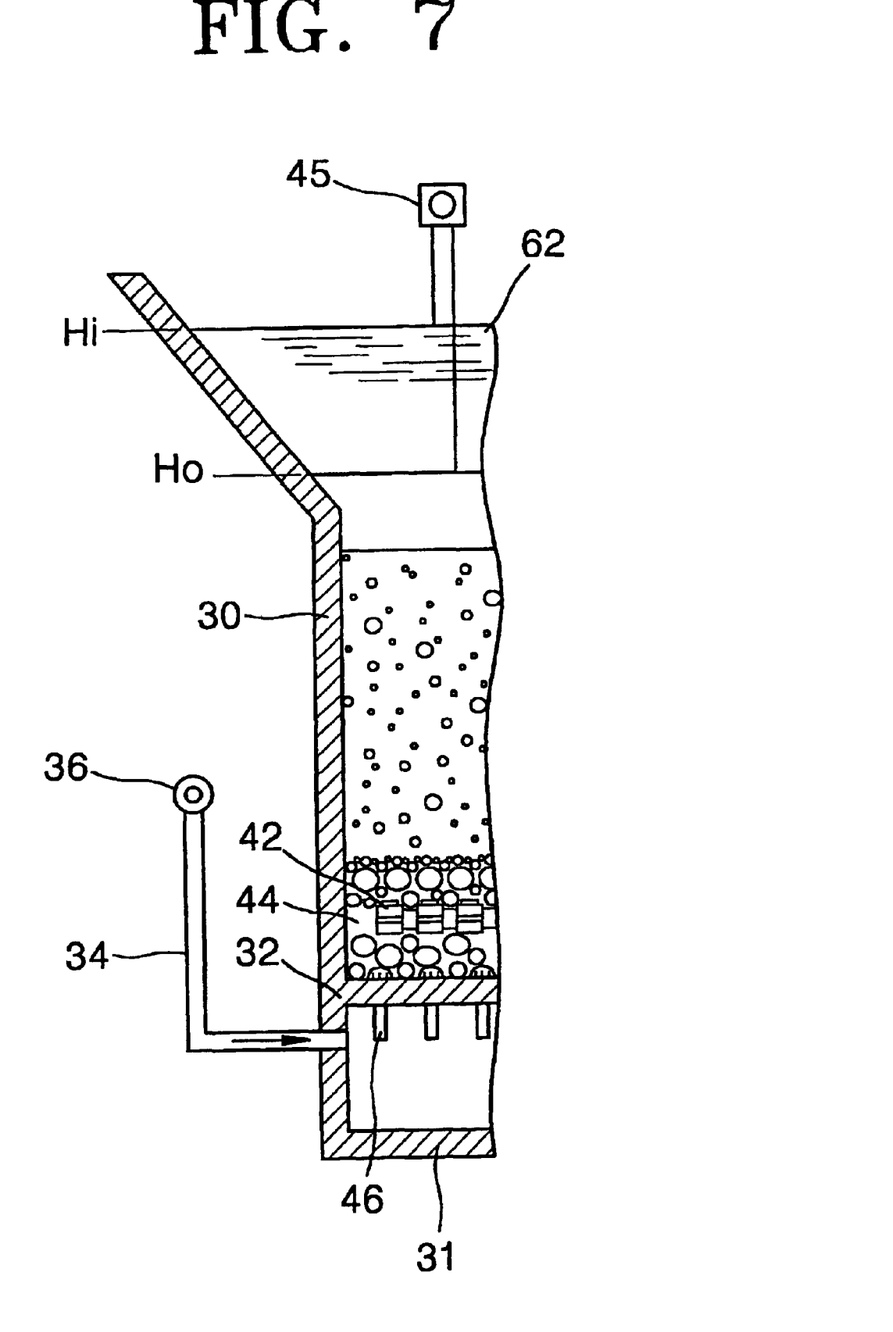
FIG. 7 is a cross-sectional view of a tapering side wall of a wastewater treatment apparatus in accordance with other embodiments of the present invention.

In the wastewater treatment apparatuses according to first through fourth embodiments of the present invention, the side walls of the upper chamber 62 may taper downward, that is, funnel-shaped, thereby maximizing the capacity of treated water contained in the upper chamber 62, as shown for example in FIG. 7. The capacity of wastewater treated in a batch can be increased by the upper chamber 62 with only one side wall tapering.

A batch style wastewater treatment method using the wastewater treatment apparatuses according to the present invention will now be described with reference to FIGS. 3 through 6, by which the structure and operating principle of the wastewater treatment apparatus will become apparent.

(1) Wastewater Treatment for Removal of Organic Matter and Solid Matter, Denitrification and Phosphorus Removal Wastewater to be treated is introduced to the lower chamber 33 through the wastewater supplying means (40 shown in FIGS. 3 and 4 or 40' shown in FIGS. 5 and 6) under non-aeration conditions, and is allowed to upwardly pass through the filter medium layer 50 until the water level of the upper chamber 62 reaches the inflow level $H_i$. The wastewater is uniformly distributed through the plurality of nozzles 46 and then upwardly passes through the support layer 52 and the filter medium layer 50 in sequence to then be transferred to the upper chamber 62. The water level adjusting means 45 stops the operation of the pump (not shown) of wastewater introducing means 40 or 40' and shuts the valve (not shown) when the water level of the upper chamber 62 reaches the inflow level $H_i$.

In order to partially remove suspended solid matter, the wastewater is preferably allowed to first pass through a settling tank or settling reservoir, which can extend a backwashing period.

Then, the wastewater contained in the upper chamber 62 under anoxic/anaerobic conditions is returned to the lower chamber 33 through the returned water introducing means 57 for circulation so as to allow upstream passage of the filter medium layer 50. Before the wastewater enters the filter medium layer 50 from the lower chamber 33, the wastewater upwardly moves to the upper portion of the plate 32 through the plurality of nozzles 46.

When the wastewater upwardly moves to the filter medium layer 50, the suspended solid matter in the wastewater is filtered by the filter medium layer 50, and denitrifying microorganisms in the filter medium layer 50 removes nitrogen from wastewater by converting nitrate nitrogen remaining in the previous cycle into gaseous nitrogen using organic matter in the wastewater.

Subordinate phosphorus removing microorganisms cause a phosphorus release reaction to occur at the lower portion of the filter medium layer 50 using organic matter in the wastewater. In order for the phosphorus release reaction to occur, there must be no dissolved oxygen. Adenosine triphosphate (ATP) in cells of the phosphorus releasing microorganisms is converted into adenosine diphosphate (ADP), releasing phosphorus and generating energy. The phosphorus releasing microorganisms store organic matter in the form of PHB (polyhydroxybutyrate) using the generated energy.

Then, the wastewater is returned from the upper chamber 62 to the lower chamber 33 through the returned water introducing means 57 and circulated for upstream passage of the filter medium layer 50, while the process air blower 38 is driven to supply air through the process air introducing means 35. The air supplied through the process air introducing means 35 flows upwardly after being uniformly distributed throughout the filter medium layer 50 in the form of fine bubbles by passing through the plurality of aerators 42 respectively mounted in the plurality of air flow pipes 44.

When the wastewater introduced to the support layer 52 and the filter medium layer 50 through the nozzles 46 flows upwardly, suspended solid matter in the wastewater is filtered by the filter medium layer 50. Under such aerobic conditions, nitrifying microorganisms nitrifies organic nitrogen and ammonium nitrogen in the wastewater using oxygen supplied, to be converted into nitrate nitrogen.

The subordinate phosphorus removing microorganisms that released phosphorus oxidize some of accumulated PHB using oxygen to excessively accumulate energy. During the oxidation process, microorganisms excessively uptake inorganic phosphorus present in the wastewater, inorganic phosphorus converted from organic phosphorus by hydrolysis and inorganic phosphorus released from cells, and store the same in the form of high molecular phosphorus. The phosphorus excessively uptaken by the microorganisms are removed in the form of solid matter during backwashing.

When the above-described steps are completed, the returned water introducing means 57, the process air introducing means 35 and the process air blower 38 stop operating, the valve (not shown) of the treated water discharging means 48 is opened and the pump (not shown) operates so that the treated water is transferred to the backwash water storage tank 54 until the water level of the upper chamber 62 reaches the outflow level. Ho After completion of the above process, before wastewater for a next batch is introduced to the reaction tank 30, the operations of all devices are idled to stop the wastewater treatment apparatus for a predetermined time. This step is performed for the purpose of adjusting a reaction time and maintaining the filter medium layer 50 at an anoxic state by consumption of oxygen due to endogenous respiration by microorganisms, before filling wastewater into the reaction tank 30.

After the idle process is completed, wastewater to be treated in a next batch is introduced into the reaction chamber 30 for repetition of the above-described steps.

Since the filter medium layer 50 is contaminated with suspended solid matter and/or outgrown microorganism sludge, after completing the steps, the wastewater treatment apparatus is backwashed regularly, for example, for two days.

During backwashing, firstly, the outlet 60 is opened to draw off the water and sludge in the lower chamber 33. Then, the backwash air is supplied to the lower chamber 33 of the reaction chamber 30 through the backwash air blower 36 and the backwash air introducing means 34 to then be supplied to the filter medium layer 50 through the plurality of nozzles 46. Here, an air layer having a predetermined height is formed in the lower chamber 33 by the nozzles 46. Thus, air having a pressure high enough for dilation of the filter medium layer 50 can be uniformly distributed. Then, backwash water is supplied to the lower chamber 33 through the backwash water introducing means 41. The backwash water introduced to the lower chamber 33 is supplied to the dilated filter medium layer 50 through the plurality of nozzles 46. The filter medium layer 50 is washed by efficiently removing contaminants smeared inside of the filter medium layer 50 by adjusting the sequence and time of the above-described steps.

(2) Wastewater Treatment for Removal of Organic Matter and Solid Matter and Nitrification Wastewater to be treated is introduced to the lower chamber 33 through the wastewater supplying means (40 shown in FIGS. 3 and 4 or 40' shown in FIGS. 5 and 6) while supplying air through the process air introducing means 35. Then, the wastewater is allowed to upwardly pass through the filter medium layer 50 to fill the upper chamber 62 until the water level of the upper chamber 62 reaches the inflow level $H_i$. The water level adjusting means 45 stops the operation of the pump (not shown) of wastewater introducing means 40 or 40' and shuts the valve (not shown) when the water level of the upper chamber 62 reaches the inflow level $H_i$.

In order to partially remove suspended solid matter, the wastewater is preferably allowed to first pass through a settling tank or settling reservoir, which can extend a backwashing period.

Then, while the process air blower 38 is driven to supply air through the process air introducing means 35, the wastewater from the upper chamber 62 is returned to the lower chamber 33 through the returned water introducing means 57 and circulated for upstream passage of the filter medium layer 50. The air supplied through the process air introducing means 35 flows upwardly after being uniformly distributed throughout the filter medium layer 50 in the form of fine bubbles by passing through the plurality of aerators 42 respectively mounted in the plurality of air flow pipes 44.

When the wastewater introduced to the support layer 52 and the filter medium layer 50 through the nozzles 46 flows upwardly, suspended solid matter in the wastewater is filtered by the filter medium layer 50. Under such aerobic conditions, nitrifying microorganisms nitrifies organic nitrogen and ammonium nitrogen in the wastewater using oxygen supplied, to be converted into nitrate nitrogen.

When the above-described steps are completed, the returned water introducing means 57, the process air introducing means 35 and the process air blower 38 stop operating, the valve (not shown) of the treated water discharging means 48 is opened and the pump (not shown) operates so that the treated water is transferred to the backwash water storage tank 54 until the water level of the upper chamber 62 reaches the outflow level $H_o$.

After completion of the above-described nitrification process, wastewater for a next batch is introduced to the reaction tank 30 and the above-described steps are then repeatedly performed.

Backwashing is performed in the same manner as in the wastewater treatment for removal of organic matter and solid matter, denitrification and phosphorus removal.

(3) Wastewater Treatment for Removal of Organic Matter and Solid Matter, Denitrification and Nitrification Wastewater to be treated is introduced to the lower chamber 33 through the wastewater supplying means (40 shown in FIGS. 3 and 4 or 40' shown in FIGS. 5 and 6) under anoxic conditions, and is allowed to upwardly pass through the filter medium layer 50 until the water level of the upper chamber 62 reaches the inflow level $H_i$. The water level adjusting means 45 stops the operation of the pump (not shown) of wastewater introducing means 40 or 40' and shuts the valve (not shown) when the water level of the upper chamber 62 reaches the inflow level $H_i$.

In order to partially remove suspended solid matter, the wastewater is preferably allowed to first pass through a settling tank or settling reservoir, which can extend a backwashing period.

Then, the wastewater contained in the upper chamber 62 under anoxic/anaerobic conditions is returned to the lower chamber 33 through the returned water introducing means 57 for circulation so as to allow upstream passage of the filter medium layer 50. Before the wastewater enters the filter medium layer 50 from the lower chamber 33, the wastewater upwardly moves to the upper portion of the plate 32 through the plurality of nozzles 46.

When the wastewater upwardly moves to the filter medium layer 50, the suspended solid matter in the wastewater is filtered by the filter medium layer 50, and denitrifying microorganisms in the filter medium layer 50 removes nitrogen from wastewater by converting nitrate nitrogen remaining in the previous cycle into gaseous nitrogen using organic matter in the wastewater.

Then, while the process air blower 38 is driven to supply air through the process air introducing means 35, the wastewater is returned from the upper chamber 62 to the lower chamber 33 through the returned water introducing means 57 and circulated for upstream passage of the filter medium layer 50.

When the above-described steps are completed, the returned water introducing means 57, the process air introducing means 35 and the process air blower 38 stop operating, the valve (not shown) of the treated water discharging means 48 is opened and the pump (not shown) operates so that the treated water is transferred to the backwash water storage tank 54 until the water level of the upper chamber 62 reaches the outflow level $H_o$.

After completion of the above process, before wastewater for a next batch is introduced to the reaction tank 30, the operations of all devices are idled to stop the wastewater treatment apparatus for a predetermined time. This step is performed for the purpose of adjusting a reaction time and maintaining the filter medium layer 50 at an anoxic state by consumption of oxygen due to endogenous respiration by microorganisms, before filling wastewater into the reaction tank 30.

After the idle process is completed, wastewater to be treated in a next batch is introduced into the reaction chamber 30 for repetition of the above-described steps.

Backwashing is performed in the same manner as in the wastewater treatment for removal of organic matter and solid matter, denitrification and phosphorus removal.

In the case of treating wastewater using the wastewater treatment apparatuses according to third and fourth embodiments respectively shown in FIGS. 4 and 6, in which the storage tank 49 is installed on the way to the returned water introducing means 57, the treated water subjected to each step is collected in the storage tank 49 rather than the upper chamber 62. Thus, the free board of the upper chamber 62 is lowered, thereby lowering the height of the reaction tank 30.

The present invention will now be described with reference to an example thereof, which are not intended as a restriction on the scope of the invention.

EXAMPLE

Sewage in a sewage treatment plant is subjected to a wastewater treatment method for removal of organic matter and solid matter, nitrification, denitrification and phosphorus removal using the apparatus shown in FIG. 3 under the following conditions.

Height of support layer: 30 cm;
Height of filter medium layer: 3 m;

Kind and size of filter medium: clay of 2–6 mm in diameter

Flow of wastewater filled: 67–133% based on the volume of filter medium layer;

Treatment time (EBCT): 3–6 hours;

Backwashing cycle: once every 2 days

The sewage having passed through a primary settling tank was used as raw wastewater to be treated. The raw wastewater and the treated water were analyzed by standard methods and the analysis results thereof are shown in Table 1, in which SCODcr represents the concentration of organic matter in wastewater, $NH_4$—N, $NO_3$—N and T-N represent the concentrations of ammonium nitrogen, nitrate nitrogen and total nitrogen in wastewater, and Ortho-P represents the concentration of phosphorus in wastewater, respectively.

TABLE 1

|  | SCODcr | $NH_4$-N | $NO_3$-N | T-N | Ortho-P |
|---|---|---|---|---|---|
| Raw wastewater | 178 | 20.1 | 0.5 | 20.6 | 6.4 |
| Treated wastewater | 22 | 1.8 | 1.8 | 3.6 | 0.1 |
| Removing efficiency | 87.6% | 91.0% | — | 82.5% | 98.4% |

(unit: mg/L)

Referring to Table 1, phosphorus in wastewater can be biologically removed through batch style wastewater treatment by using a batch style wastewater treatment apparatus using a biological filtering process according to the present invention, and both nitrogen and phosphorus can be effectively removed in a single reaction tank at the same time. Thus, the operation of the wastewater treatment apparatus is simplified.

Table 2 shows the comparison results of treatment efficiencies in the batch style wastewater treatment according to the present invention and the conventional sequencing wastewater treatment.

TABLE 2

|  |  | Sequencing biological filtering process | Batch style biological filtering process |
|---|---|---|---|
| Processing conditions | Treatment hour (Hr) | 2 | 4 |
|  | Biological removal function of phosphorus | X | O |
|  | Operation style | Sequencing style | Batch style |
| Treatment efficiencies (%) | BOD | 90 | 95 |
|  | COD | 80 | 90 |
|  | SS | 95 | 97 |
|  | T-N | 70 | 80 |
|  | $NH_4$-N | 98 | 98 |
|  | T-P | 50 | 90 |
|  | Ortho-P | 20 | 90 |

Here, BOD refers to biological oxygen demand, COD refers to chemical oxygen demand, SS refers to suspended solid and T-P refers to total phosphorus, respectively.

Referring to Table 2, according to the batch style wastewater treatment of the present invention, the organic matter, suspended solid matter, nitrogen and phosphorus can be efficiently removed, compared to the conventional sequencing wastewater treatment, even though it takes a longer reaction time. In particular, whereas phosphorus is hardly removed by the sequencing biological filtering process, phosphorus can be efficiently removed according to the present invention.

The wastewater treatment using the wastewater treatment apparatus according to the present invention has the following advantages.

First, phosphorus in wastewater can be biologically removed by phosphorus release and excessive uptake by microorganisms.

Second, since organic contaminants, suspended contaminants, nitrogen and phosphorus are efficiently removed in a single reaction tank, the configuration and operation of the wastewater treatment apparatus can be simplified and the quality of the treated water is good.

Third, since a separate settling tank is not required, the wastewater treatment apparatus can be installed even at a small area.

Fourth, since the wastewater treatment system is highly stable to allow an automated operation, a considerable workforce can be saved and easy operation can be achieved.

What is claimed is:

1. A wastewater treatment apparatus comprising:

a bottom portion and a plate formed above and spaced apart from the bottom portion to form a lower chamber with the bottom portion;

an outlet installed on the bottom portion for drawing off water and sludge in the lower chamber before backwashing;

a filter medium layer supported to the upper portion of the plate by the plate, the upper layer of which forms a bottom portion of an upper chamber;

a wastewater introducing means connected to the lower chamber, for introducing wastewater to be treated into the lower chamber;

a process air introducing means for supplying process air to the filter medium layer formed over the plate;

a plurality of aerators formed over and spaced apart a predetermined distance from the plate, and mounted in a plurality of air flow pipes led to the process air introducing means;

a backwash air introducing means for supplying backwash air to the lower chamber during backwashing;

a backwash water introducing means for supplying backwash water to the lower chamber during backwashing;

a plurality of nozzles extending from the lower chamber to the filter medium layer through the plate;

a treated water discharging means for discharging the treated water having passed through the filter medium layer; and a returned water introducing means for returning the treated water having passed through the filter medium layer to the lower chamber.

2. The wastewater treatment apparatus according to claim 1, wherein the filter medium layer is upwardly passed through by the wastewater to be treated, treated water or mixed water thereof, with or without process air, during normal operation, and the filter medium layer is upwardly passed through by backwash air and backwash water during backwashing.

3. The wastewater treatment apparatus according to claim 1, wherein the plurality of aerators uniformly distribute process air in the form of fine bubbles for creating optimum conditions for growth of microorganisms during normal operation, and includes means for preventing a counterflow of the treated water during backwashing even if supply of the process air or backwash air is inhibited.

4. The wastewater treatment apparatus according to claim 1, wherein the plurality of nozzles supply the wastewater to be treated, treated water or mixed water thereof, from the lower chamber to the filter medium layer, during normal operation, and include means for forming an air layer having a predetermined height at the lower chamber so as to uniformly distribute backwash air having a pressure high enough to dilate the filter medium layer, during backwashing.

5. The wastewater treatment apparatus according to claim 1, wherein the filter medium layer is supported by a support layer having a predetermined height covering the aerators from the upper surface of the plate.

6. The wastewater treatment apparatus according to claim 1, further comprising an water level adjusting means for automatically adjusting the water level of the upper chamber.

7. The wastewater treatment apparatus according to claim 6, wherein the side walls of the upper chamber taper downward to maximize the capacity of treated water contained in the upper chamber.

8. The wastewater treatment apparatus according to claim 1, further comprising a storage tank for temporarily storing the treated water introduced through the returned water introducing means and then supplying the same to the lower chamber.

9. A wastewater treatment method comprising the steps of:
(a) introducing wastewater to be treated to the lower chamber through the wastewater introducing means of the wastewater treatment apparatus according to claim 1 and allowing the wastewater to upwardly pass through the filter medium layer until the water level of the upper chamber reaches an inflow level, under non-aeration conditions;
(b) returning the wastewater contained in the upper chamber to the lower chamber through the returned water introducing means for circulation so as to allow upstream passage of the filter medium layer under anoxic/ anaerobic conditions, to denitrify nitrate nitrogen remaining in the previous cycle using organic matter in the wastewater and denitrifying microorganisms in the filter medium layer and also to cause a phosphorus release reaction to occur using organic matter in the wastewater and subordinate phosphorus removing microorganisms in the filter medium layer;
(c) returning the wastewater from the upper chamber to the lower chamber through the returned water introducing means and causing the returned wastewater to circulate for upstream passage of the filter medium layer, while supplying air through the process air introducing means, to nitrify organic nitrogen and ammonium nitrogen using nitrifying microorganisms and to cause an excessive uptake of phosphorus using subordinate phosphorus removing microorganisms; and
(d) discharging the treated water through the treated water discharging means.

10. The wastewater treatment method according to claim 9, before supplying the wastewater to the wastewater treatment apparatus, further comprising the step of introducing the wastewater to be treated to a settling tank for removal of some of suspended solid in the wastewater.

11. The wastewater treatment method according to claim 9, after the discharging step, further comprising the steps of supplying backwash air from the lower chamber to the filter medium layer through a backwash air introducing means and the plurality of nozzles to dilate the filter medium layer, stopping the supply of backwash air and supplying backwash water through the backwash water introducing means and the plurality of nozzles to backwash the filter medium layer.

12. The wastewater treatment method according to claim 11, wherein the backwash water is the treated water discharged in the discharging step of:
(a) introducing wastewater to be treated to the lower chamber through the wastewater introducing means of the wastewater treatment apparatus and allowing the wastewater to upwardly pass through the filter medium layer until the water level of the upper chamber reaches an inflow level, under non-aeration conditions;
(b) returning the wastewater contained in the upper chamber to the lower chamber through the returned water introducing means for circulation so as to allow upstream passage of the filter medium layer under anoxic/ anaerobic conditions, to denitrify nitrate nitrogen remaining in the previous cycle using organic matter in the wastewater and denitrifying microorganisms in the filter medium layer and also to cause a phosphorus release reaction to occur using organic matter in the wastewater and subordinate phosphorus removing microorganisms in the filter medium layer;
(c) returning the wastewater from the upper chamber to the lower chamber through the returned water introducing means and causing the returned wastewater to circulate for upstream passage of the filter medium layer, while supplying air through the process air introducing means, to nitrify organic nitrogen and ammonium nitrogen using nitrifying microorganisms and to cause an excessive, uptake of phosphorus using subordinate phosphorus removing microorganisms; and
(d) discharging the treated water through the treated water discharging means.

13. The wastewater treatment method according to claim 9, wherein the respective steps are repeated by automatic operation by a programmable logic controller.

14. A wastewater treatment method comprising the steps of:
(a) while supplying air through the process air introducing means of the wastewater treatment apparatus according to claim 1, introducing wastewater to be treated to the lower chamber through the wastewater introducing means and allowing the wastewater to upwardly pass through a filter medium layer until the water level of an upper chamber reaches an inflow level;
(b) returning the wastewater from the upper chamber to the lower chamber through the returned water introducing means and causing the returned wastewater to circulate for upstream passage of the filter medium layer, while supplying air through the process air introducing means, to nitrify organic nitrogen and ammonium nitrogen using nitrifying microorganisms; and
(c) discharging the treated water subjected to the nitrification through the treated water discharging means.

15. A wastewater treatment method comprising the steps of:
(a) introducing wastewater to be treated to a lower chamber through a wastewater introducing means of the wastewater treatment apparatus according to claim 1 and allowing the wastewater to upwardly pass through a filter medium layer until the water level of an upper chamber reaches an inflow level, under non-aeration conditions;

(b) returning the wastewater contained in the upper chamber to the lower chamber through a returned water introducing means for circulation so as to allow upstream passage of the filter medium layer under anoxic conditions, to denitrify nitrate nitrogen remaining in the previous cycle using organic matter in the wastewater and denitrifying microorganisms in the filter medium layer;

(c) returning the wastewater from the upper chamber to the lower chamber through the returned water introducing means and causing the returned wastewater to circulate for upstream passage of the filter medium layer, while supplying air through the process air introducing means, to nitrify organic nitrogen and ammonium nitrogen using nitrifying microorganisms; and (d) discharging the treated water subjected to the nitrification through the treated water discharging means.

16. A wastewater treatment apparatus comprising:

a bottom portion and a plate formed above and spaced apart from the bottom portion to form a lower chamber with the bottom portion;

an outlet installed on the bottom portion for drawing off water and sludge in the lower chamber before backwashing;

a filter medium layer supported to the upper portion of the plate by the plate, the upper layer of which forms a bottom portion of an upper chamber;

a process air introducing means for supplying process air to the filter medium layer formed over the plate;

a plurality of aerators formed over and spaced apart a predetermined distance from the plate, and mounted in a plurality of air flow pipes led to the process air introducing means;

a backwash air introducing means for supplying backwash air to the lower chamber during backwashing;

a backwash water introducing means for supplying backwash water to the lower chamber during backwashing;

a plurality of nozzles extending from the lower chamber to the filter medium layer through the plate;

a treated water discharging means for discharging the treated water having passed through the filter medium layer;

a returned water introducing means for returning the treated water having passed through the filter medium layer to the lower chamber; and a wastewater introducing means connected to the returned water introducing means, for introducing wastewater to be treated into the lower chamber.

17. A wastewater treatment method comprising the steps of:

(a) introducing wastewater to be treated to the lower chamber through the wastewater introducing means connected to the returned water introducing means of the wastewater treatment apparatus according to claim 16 and allowing the wastewater to upwardly pass through the filter medium layer until the water level of an upper chamber reaches an inflow level, under non-aeration conditions;

(b) returning the wastewater contained in the upper chamber to the lower chamber through a returned water introducing means for circulation so as to allow upstream passage of the filter medium layer under anoxic/ anaerobic conditions, to denitrify nitrate nitrogen remaining in the previous cycle using organic matter in the wastewater and denitrifying microorganisms in the filter medium layer and also to cause a phosphorus release reaction to occur using organic matter in the wastewater and subordinate phosphorus removing microorganisms in the filter medium layer;

(c) returning the wastewater from the upper chamber to the lower chamber through the returned water introducing means and causing the returned wastewater to circulate for upstream passage of the filter medium layer, while supplying air through the process air introducing means, to nitrify organic nitrogen and ammonium nitrogen using nitrifying microorganisms and to cause an excessive uptake of phosphorus using subordinate phosphorus removing microorganisms; and (d) discharging the treated water from which organic matter, nitrogen and phosphorus are removed through the treated water discharging means.

18. A wastewater treatment method comprising the steps of:

(a) while supplying air, introducing wastewater to be treated to a lower chamber through a wastewater introducing means connected to a returned water introducing means of the wastewater treatment apparatus according to claim 16 and allowing the wastewater to upwardly pass through a filter medium layer until the water level of an upper chamber reaches an inflow level;

(b) returning the wastewater from the upper chamber to the lower chamber through the returned water introducing means and causing the returned wastewater to circulate for upstream passage of the filter medium layer, while supplying air through the process air introducing means, to nitrify organic nitrogen and ammonium nitrogen using nitrifying microorganisms; and (c) discharging the treated water subjected to the nitrification through the treated water discharging means.

19. A wastewater treatment method comprising the steps of:

(a) under a non-aeration conditions, introducing wastewater to be treated to a lower chamber through a wastewater introducing means connected to a returned water introducing means of the wastewater treatment apparatus according to claim 16 and allowing the wastewater to upwardly pass through a filter medium layer until the water level of an upper chamber reaches an inflow level;

(b) returning the wastewater contained in the upper chamber to the lower chamber through a returned water introducing means for circulation so as to allow upstream passage of the filter medium layer under anoxic conditions, to denitrify nitrate nitrogen remaining in the previous cycle, using organic matter in the wastewater and denitrifying microorganisms in the filter medium layer;

(c) returning the wastewater from the upper chamber to the lower chamber through the returned water introducing means and causing the returned wastewater to circulate for upstream passage of the filter medium layer, while supplying air through the process air introducing means, to nitrify organic nitrogen and ammonium nitrogen using nitrifying microorganisms; and (d) discharging the treated water subjected to the nitrification through the treated water discharging means.

* * * * *